Figure 1:
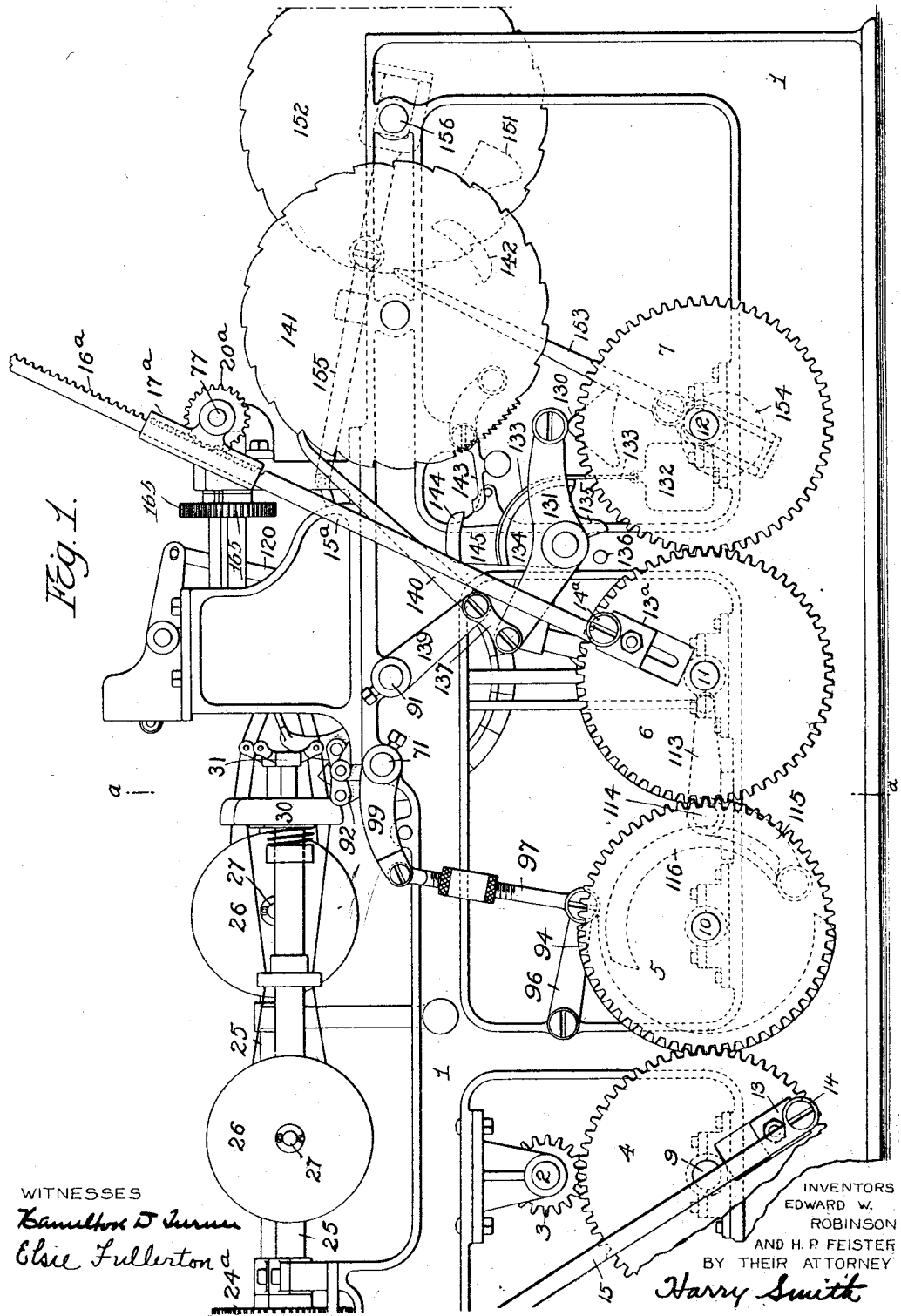

E. W. ROBINSON & H. P. FEISTER.
BARREL MAKING MACHINE.
APPLICATION FILED APR. 29, 1911.

1,052,177.

Patented Feb. 4, 1913.
10 SHEETS—SHEET 1.

WITNESSES

INVENTORS
EDWARD W. ROBINSON
AND H. P. FEISTER
BY THEIR ATTORNEY
Harry Smith

E. W. ROBINSON & H. P. FEISTER.
BARREL MAKING MACHINE.
APPLICATION FILED APR. 29, 1911.
1,052,177.
Patented Feb. 4, 1913.
10 SHEETS—SHEET 2.
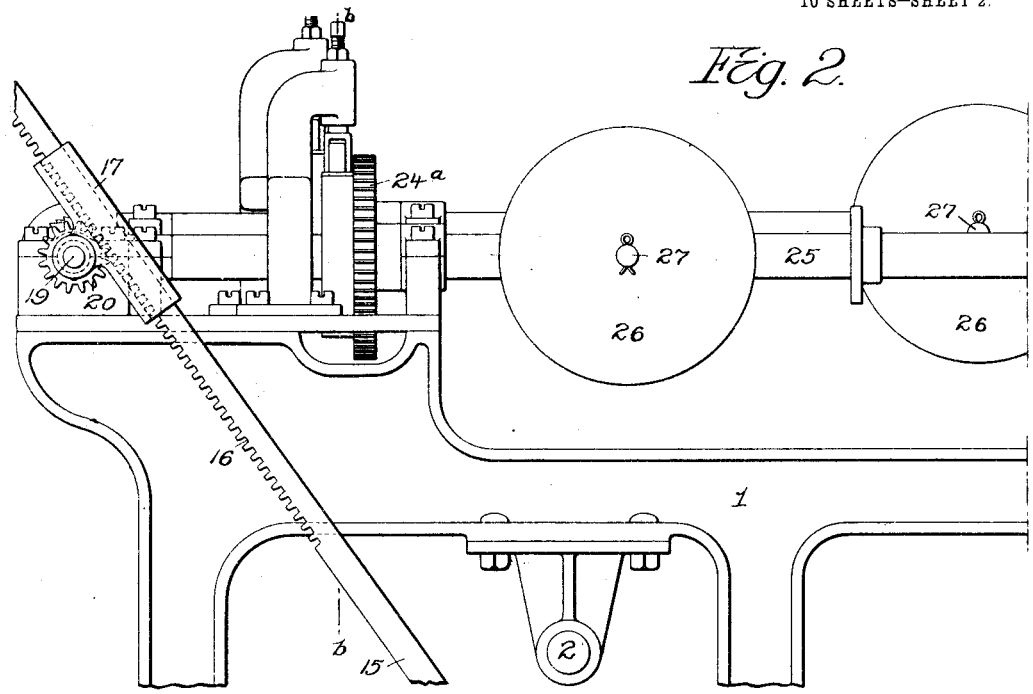
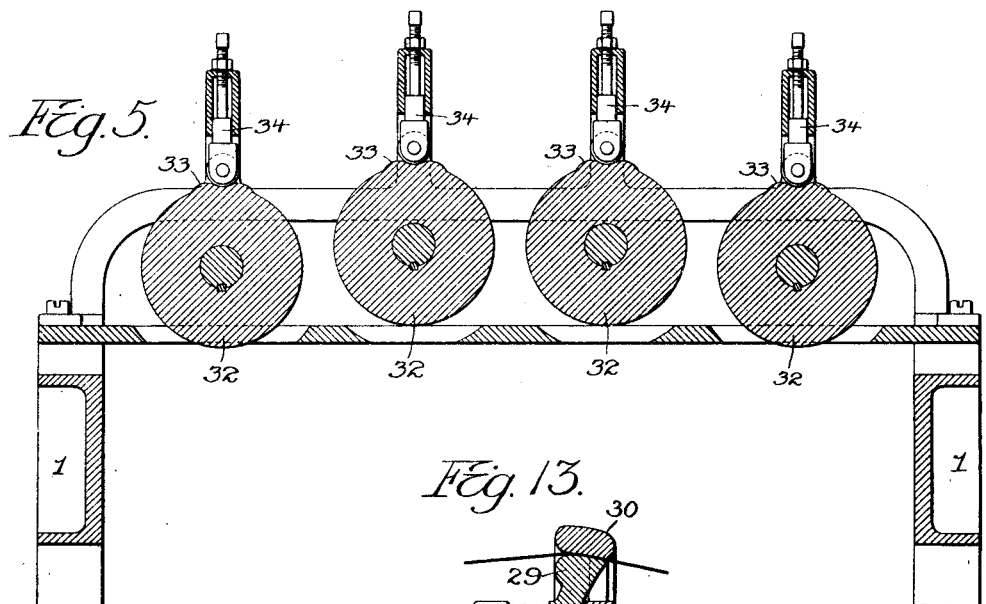
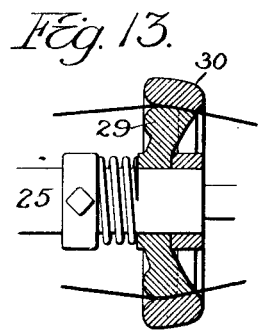
WITNESSES
Hamilton D. Turner
Elsie Fullerton
INVENTORS
EDWARD W. ROBINSON
AND H. P. FEISTER
BY THEIR ATTORNEY
Harry Smith

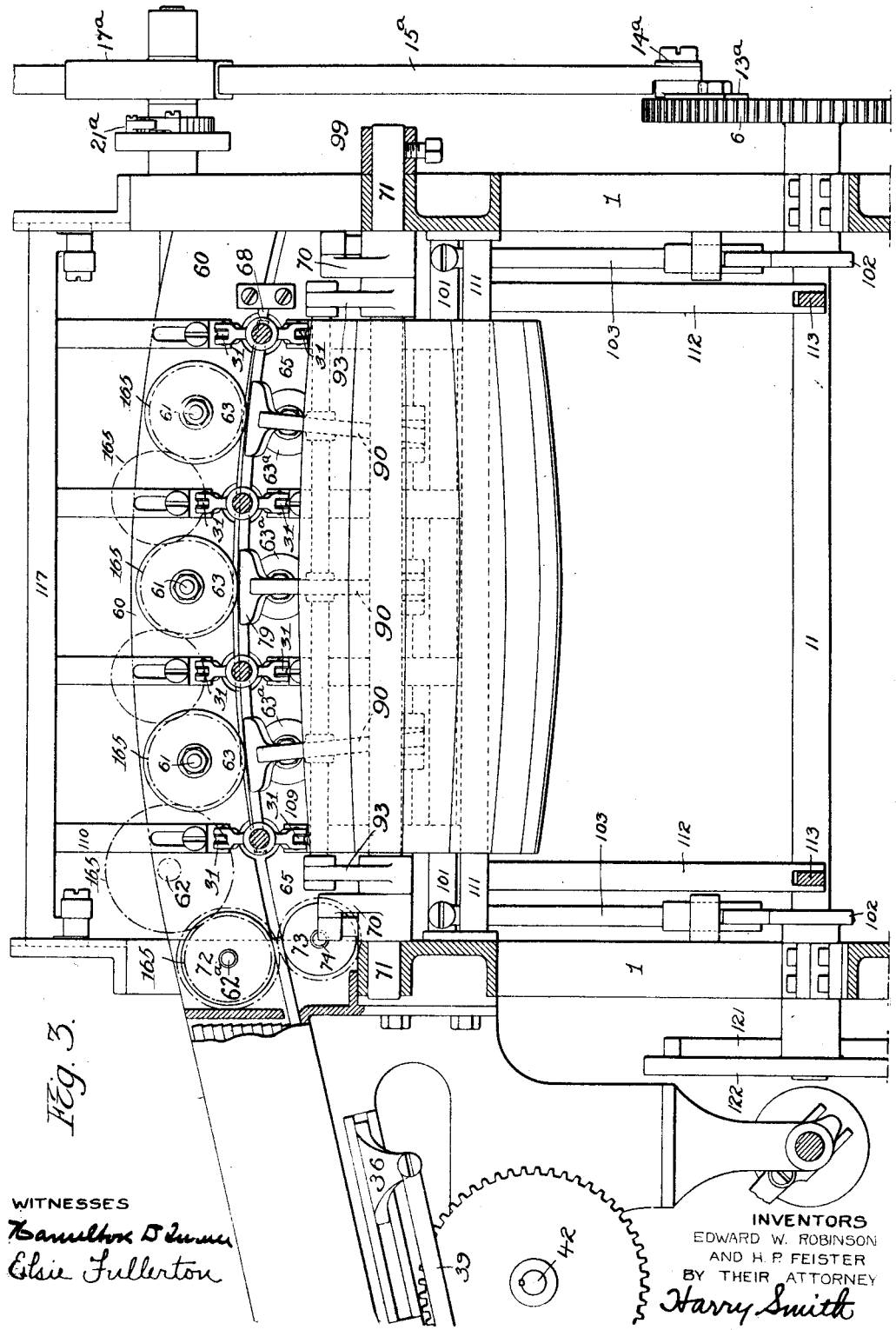

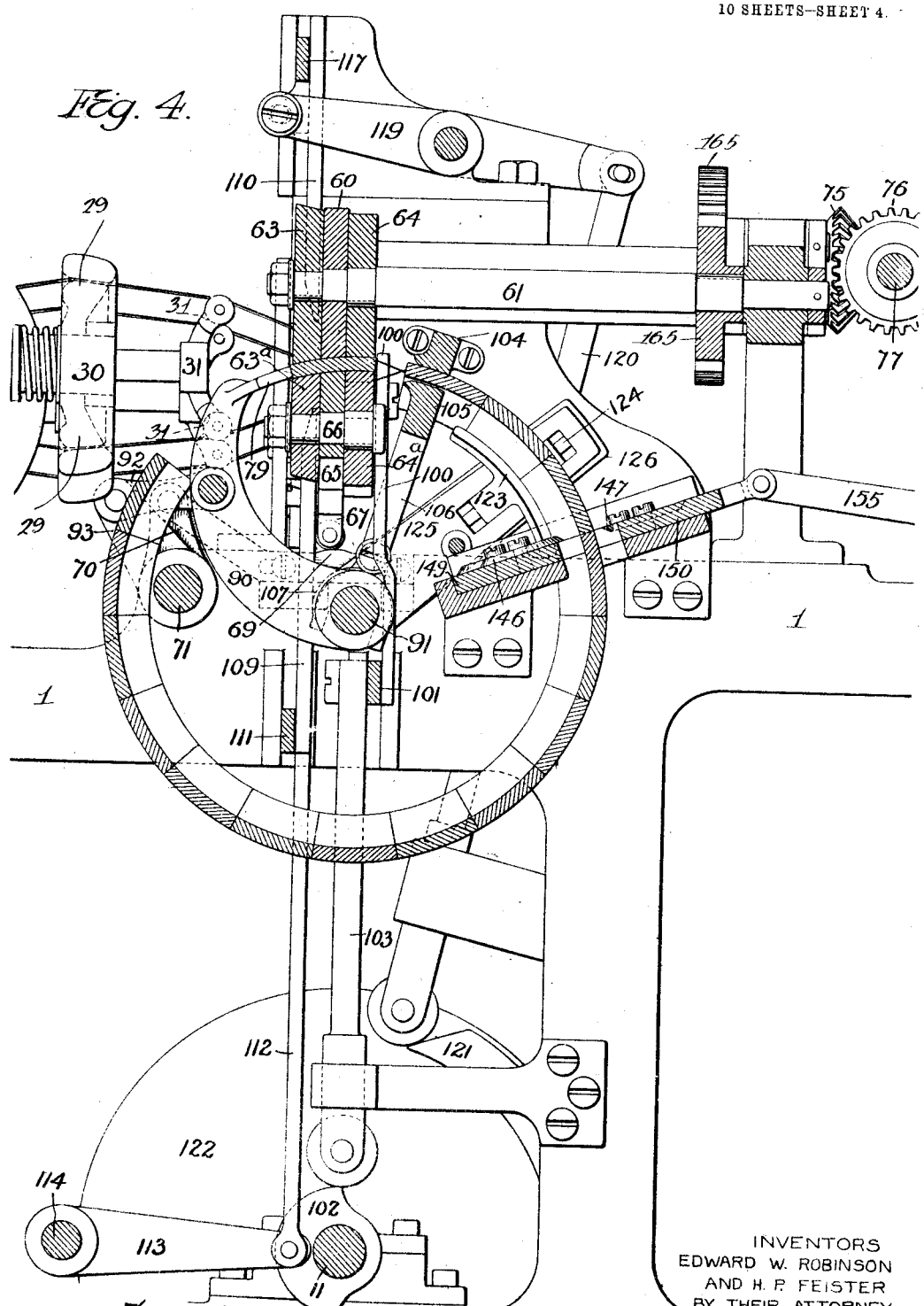

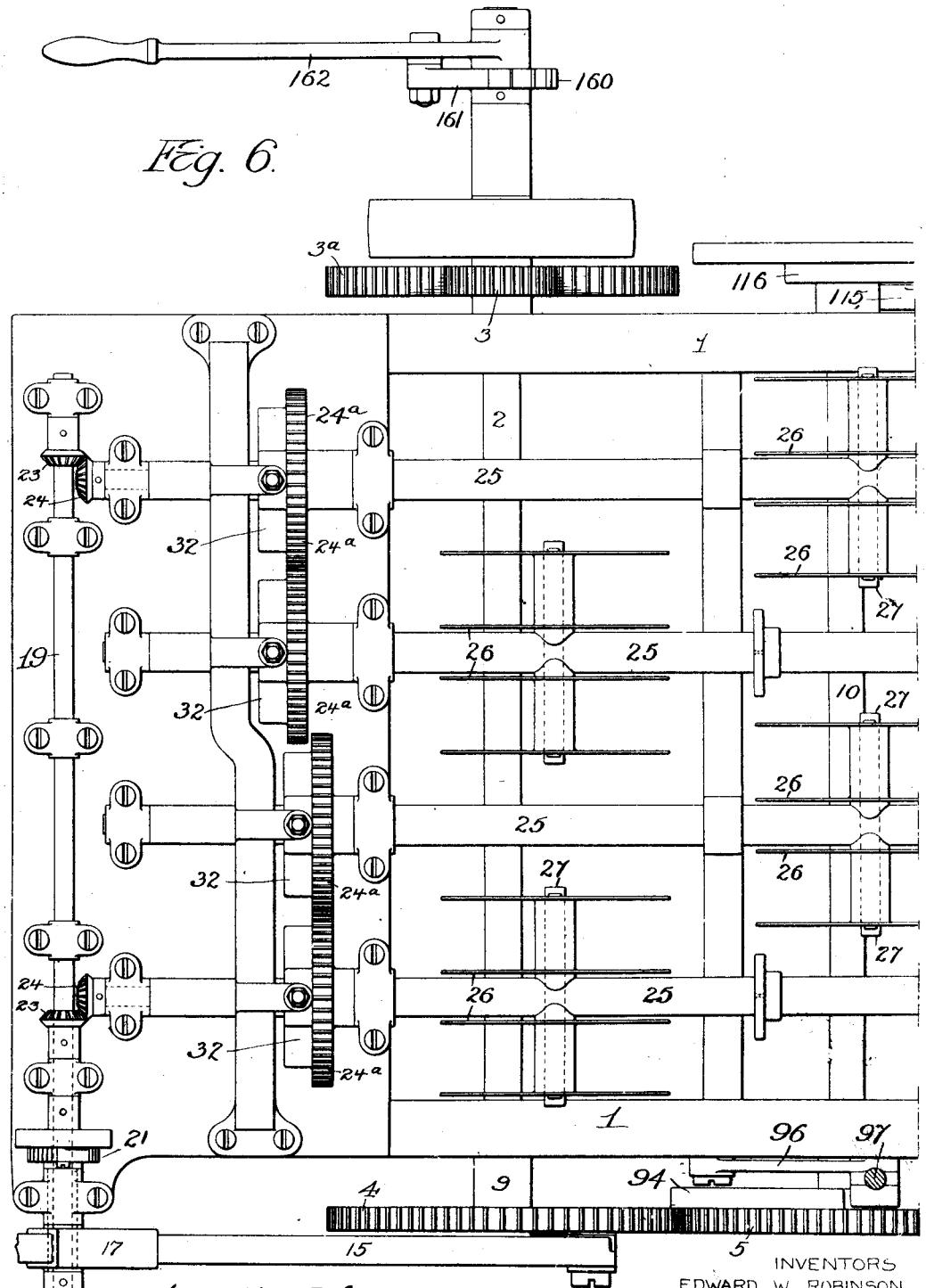

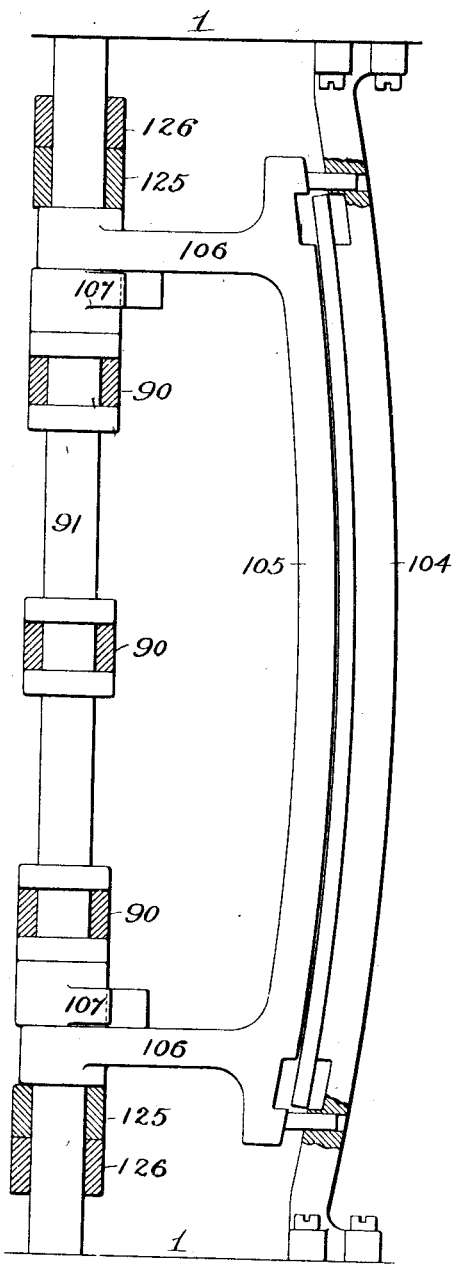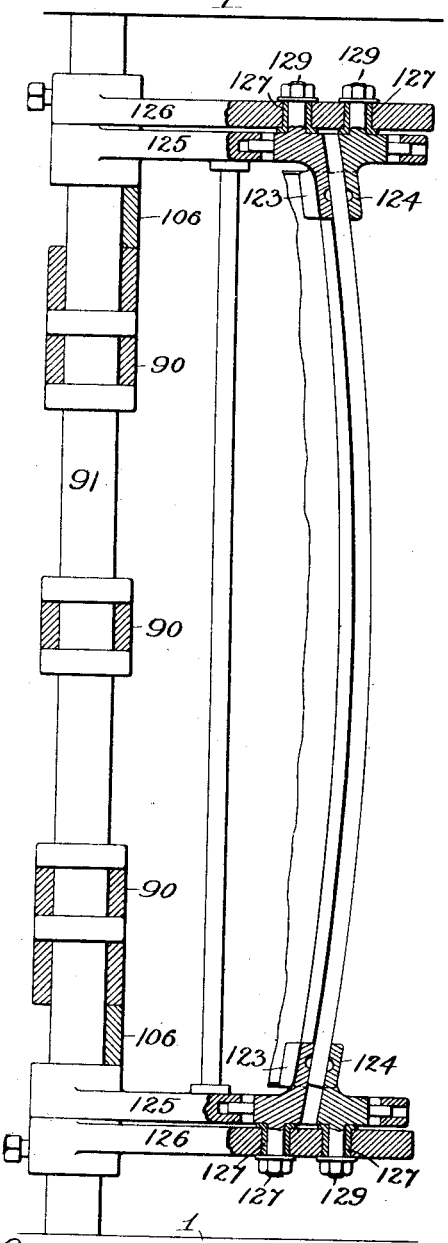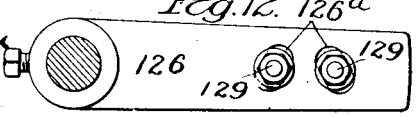

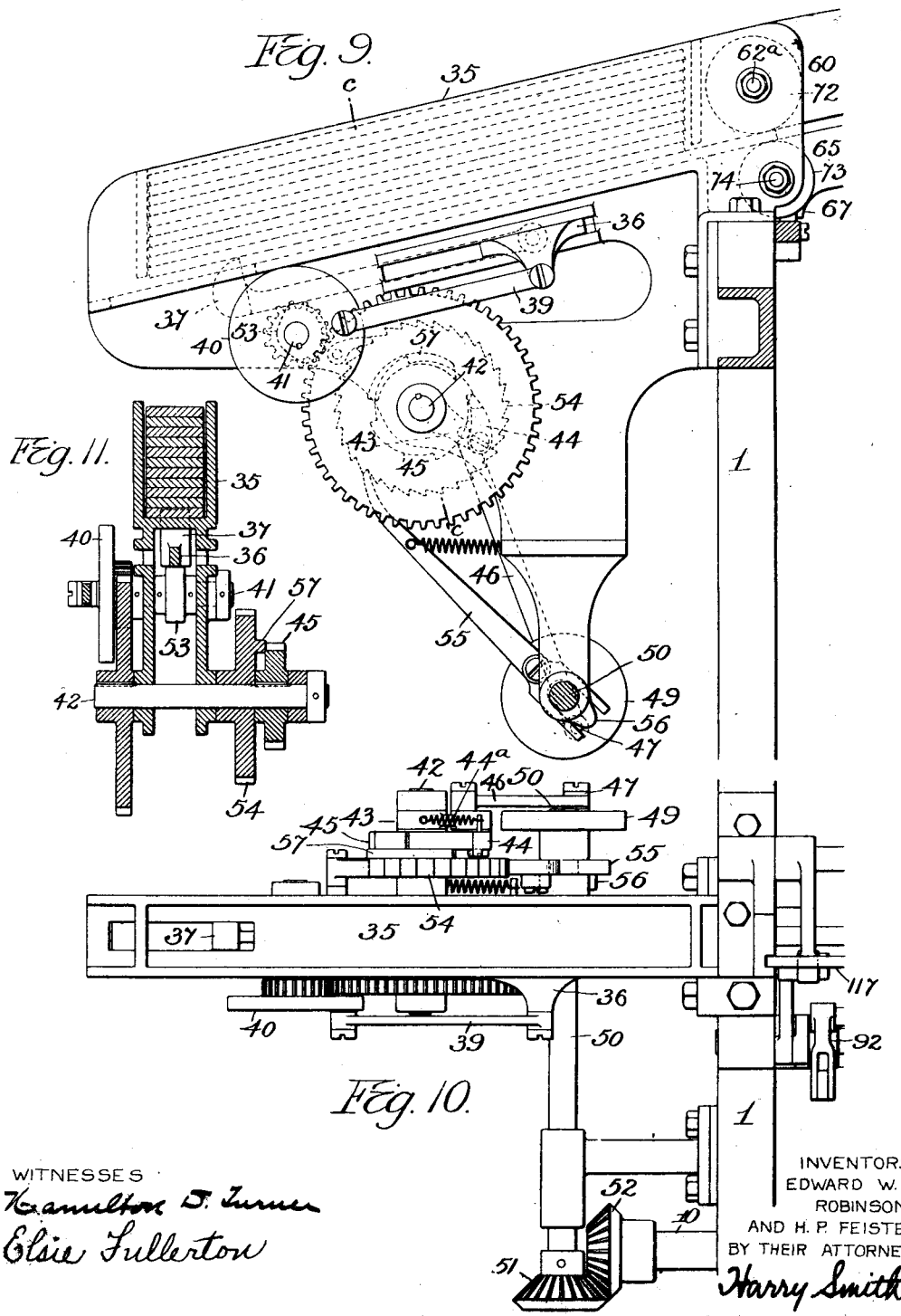

E. W. ROBINSON & H. P. FEISTER.
BARREL MAKING MACHINE.
APPLICATION FILED APR. 29, 1911.
1,052,177.
Patented Feb. 4, 1913.
10 SHEETS—SHEET 8.
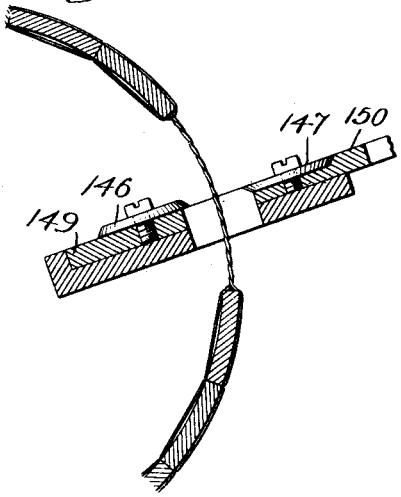
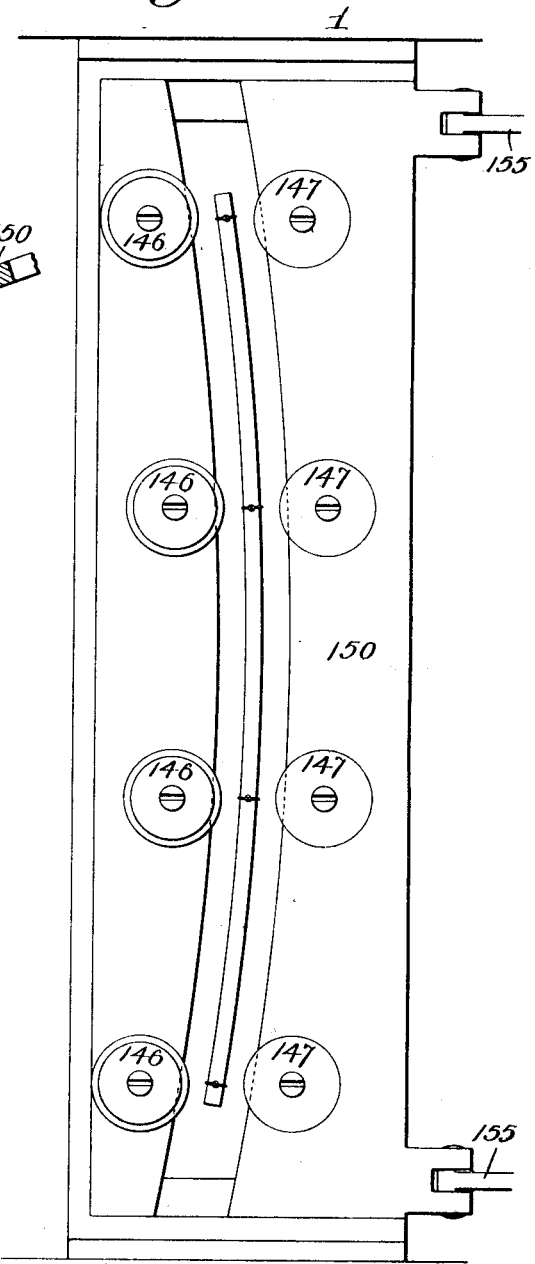
WITNESSES
Hamilton D. Turner
Elsie Fullerton
INVENTORS
EDWARD W. ROBINSON
AND H. P. FEISTER
BY THEIR ATTORNEY
Harry Smith

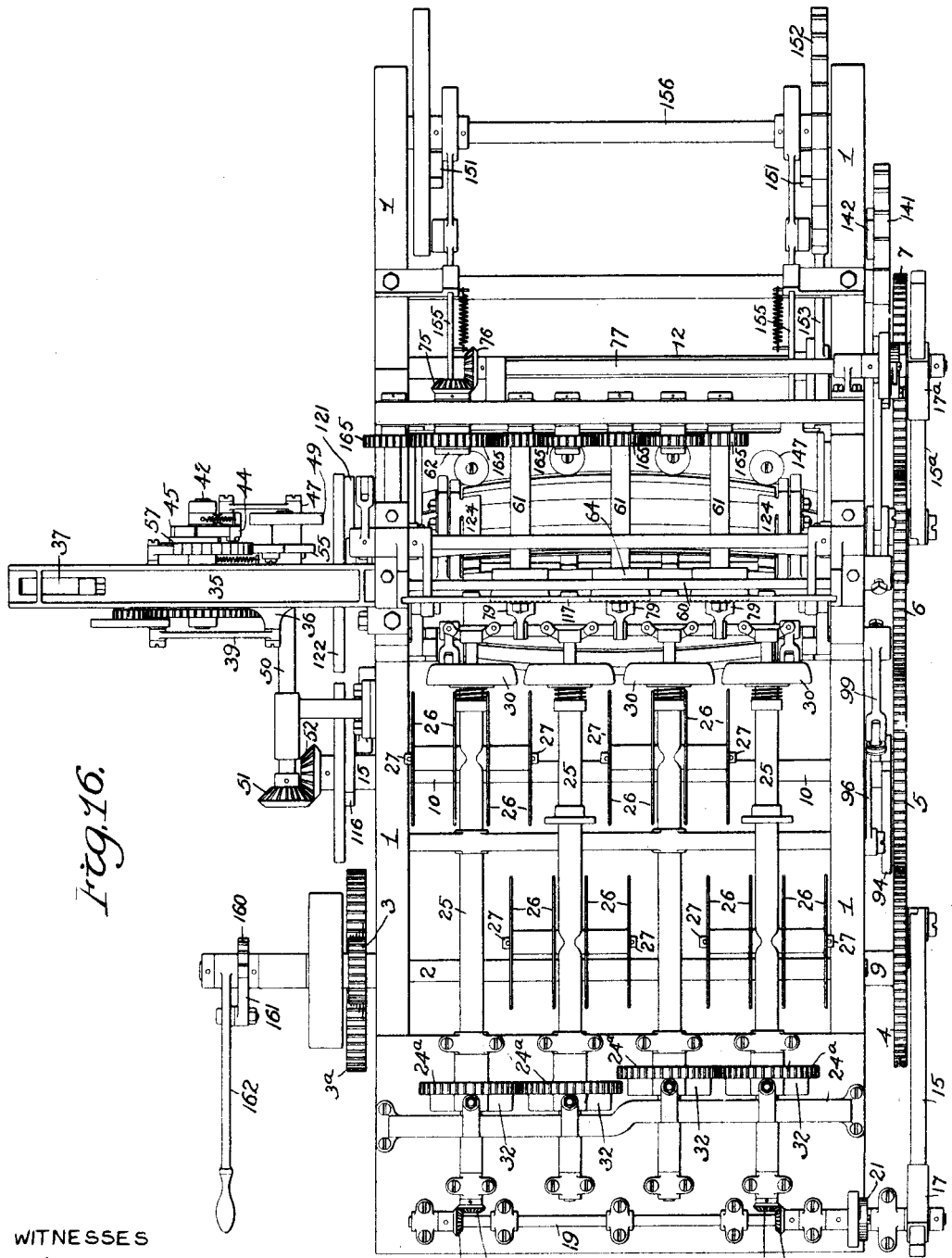

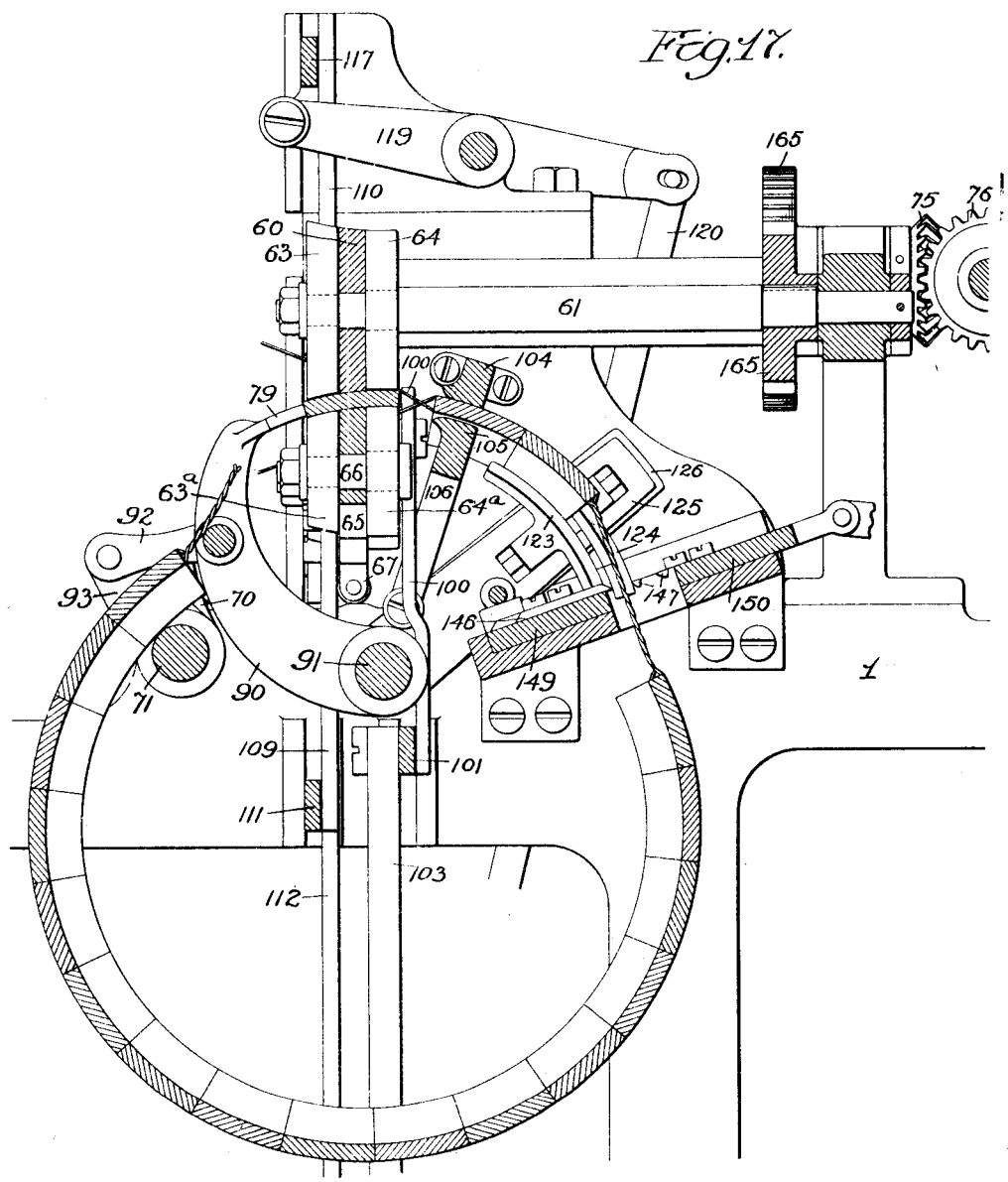

UNITED STATES PATENT OFFICE.

EDWARD W. ROBINSON, OF SAVANNAH, GEORGIA, AND HENRY P. FEISTER, OF PHILADELPHIA, PENNSYLVANIA, ASSIGNORS, BY MESNE ASSIGNMENTS, TO INTERNATIONAL BARREL COMPANY, OF SAVANNAH, GEORGIA, A CORPORATION OF GEORGIA.

BARREL-MAKING MACHINE.

1,052,177. Specification of Letters Patent. Patented Feb. 4, 1913.

Application filed April 29, 1911. Serial No. 624,163.

*To all whom it may concern:*

Be it known that we, EDWARD W. ROBINSON and HENRY P. FEISTER, citizens of the United States, residing, respectively, in Savannah, Georgia, and Philadelphia, Pennsylvania, have invented certain Improvements in Barrel-Making Machines, of which the following is a specification.

Our invention relates to the manufacture of barrels of that type in which the staves are interwoven with a plurality of pairs of wires, whereby the staves are held in their proper relation to form the barrel, the object of our invention being to provide a machine for the manufacture of bilged barrels of this type having close fitting staves. This object we attain in the manner hereinafter set forth, reference being had to the accompanying drawings, in which—

Figure 1 is a side elevation of the main portion of the machine constructed in accordance with our invention, part of the mechanism at the left hand end of the machine being omitted; Fig. 2 is a side elevation illustrating the mechanism at the left hand end of the machine, this view being on a larger scale than Fig. 1; Fig. 3 is a transverse section of part of the machine on the line *a—a*, Fig. 1, but on a larger scale; Fig. 4 is a longitudinal vertical section of part of the machine on a still larger scale; Fig. 5 is a transverse section of the machine on the line *b—b*, Fig. 2; Fig. 6 is a plan view of that portion of the machine illustrated in Fig. 2; Fig. 7 is a transverse section illustrating the barrel-blank feeding devices of the machine; Fig. 8 is a transverse section of the stave gripping devices; Fig. 9 is a transverse section illustrating the devices for feeding successive staves into the machine; Fig. 10 is a plan view of said devices; Fig. 11 is a section on the line *c—c*, Fig. 9; Fig. 12 is an end view of the stave feeding devices shown in Fig. 7; Fig. 13 is a sectional view on an enlarged scale of certain wire-clamping devices shown in Fig. 1; Fig. 14 is a plan view of the wire cutting devices shown in Fig. 4; Fig. 15 is a sectional view illustrating the connection between successive barrel blanks upon which said wire cutting devices are intended to act. Fig. 16 is a plan or top view of the complete machine, and Fig. 17 is a view similar to Fig. 4, but showing the parts in the position assumed by them after the formation of the barrel blank has been completed.

The machine as designed is intended to act upon staves which are originally flat but which, in the operation of the machine, are longitudinally bent or bilged and also transversely bent into the form which they ultimately retain in the finished barrel. The staves thus shaped are interwoven with the desired number of pairs of wires, to produce what we term a "barrel blank" the pairs of wires being twisted together for a certain length, after such barrel blank has been produced, and said twisted wires being then cut in order to permit the barrel blank to free itself from the machine.

In the accompanying drawings, 1—1 represent the opposite side frames of the machine provided with suitable bearings for the main drive shaft 2 which, through the medium of suitable spur gears 3, $3^a$, 4, 5, 6 and 7, drive four parallel shafts 9, 10, 11 and 12, likewise adapted to suitable bearings on the opposite side frames of the machine. The spur wheel 4 is provided with a radially adjustable slide 13 which can be secured in position after adjustment and which carries a crank pin 14, the latter engaging the lower end of a rod 15 whose upper end is provided with a rack 16 (Fig. 2) said rack being guided in a sleeve 17 pivotally mounted upon a shaft 19, turning in suitable bearings mounted upon the top of the side frames 1. Upon the shaft 19 is free to turn a spur wheel 20 which is in mesh with the rack 16, this spur wheel 20 having a pawl and ratchet connection 21 with the shaft 19 so that when the rack 16 is moved in one direction the spur wheel 20 will impart movement to said shaft 19, but when the rack is moved in the opposite direction, said spur wheel will be free to turn on the shaft without imparting movement thereto. The shaft 19, through the medium of bevel gears 23 and 24 and spur gears $24^a$, imparts intermittent rotative movement to a series of shafts 25 each carrying a pair of spools 26 on which are wound the wires with which the staves of the barrel are to be interwoven, the number of these shafts being dependent upon the number of pairs of wires employed in the construction of the barrel.

The barrel produced upon the machine shown in the drawings is intended to have four pairs of wires, consequently there are four shafts 25 and four pairs of wire-spools, each of the latter being rotatably mounted upon a stud 27 projecting from its respective shaft 25. The wires from each pair of spools pass between a pair of tension rings 29 and 30 (Fig. 13) which are mounted upon and rotate with the shaft 25 corresponding to said pair of spools, the wires passing from these tension rings over rollers carried by the arms of a twister head 31 secured to and rotating with said shaft 25, from which rollers the wires pass to the staves which are to be interwoven therewith.

In order to prevent overrunning of the shafts 25 by momentum, each shaft has secured to it a disk 32 (Fig. 5) which disk is provided with a notched lug 33 and in a hollow bracket above each of these disks is mounted so as to slide vertically a spring-actuated plunger 34 carrying at its lower end an anti-friction roller which normally rests in the notch of said lug 33 and prevents rotation of the disk 32 at all times except when rotative movement is being imparted to the corresponding shaft 25 through the medium of the gearing before described, the movement of each shaft 25 being thereby arrested after one or more turns have been imparted thereto, depending upon the number of twists to be formed in the wires between the successive staves.

The staves are piled one upon another in a hopper 35 at one side of the machine and stave after stave from the bottom of the pile is pushed into the machine by means of a reciprocating slide 36 adapted to suitable guides on the frame of the machine, the rear end of this slide having a toe 37 which engages the rear end of the lowermost stave and, as the slide 36 moves inwardly, pushes said stave into the machine.

The slide 36 is reciprocated by means of a crank pin 39 on a disk 40, the latter being secured to a shaft 41 which is geared to a shaft 42 upon which is mounted, so as to be free to swing, an arm 43 carrying a pawl 44, the latter engaging with the teeth of a ratchet wheel 45 on the shaft 42 (see Fig. 9). The arm 43 is connected by a rod 46 to a crank pin 47 on a disk 49 carried by a shaft 50, to which rotating motion is imparted by bevel gears 51 and 52 from the shaft 10 (see Fig. 10). On each rotation of the shaft 50, therefore, movement of partial rotation will be imparted to the shaft 42 and a complete rotation to the shaft 41 so as to impart forward and backward movement to the pusher slide 36 to an extent sufficient to cause the nose 37 of the latter to engage the rear end of a stave and push said stave in the direction of its length until its forward end is caught by the feeding and shaping rollers of the machine which will be hereinafter described. The outer portion of the pusher slide 36 rests upon a cam 53 on the shaft 41, the slide during its forward movement bearing upon the high portion of this cam so that the nose 37 is lifted into engagement with the lowermost stave of the pile, but, on the outward or retracting movement of the pusher slide 36 the latter will rest upon the lower portion of the cam and the nose 37 will be dropped, so that it will not interfere with the descent of the pile of staves in the hopper and will be free from scraping contact with the lowermost stave.

In the operation of the machine a certain number of staves are fed thereto and the feeding of the staves is then arrested while the barrel blank is being carried forward and the wires are being twisted in the rear of the last inserted stave. For the purpose of thus arresting the feeding of the staves into the machine we arrest at the proper time the reciprocation of the stave pusher 36, this result being attained in the following manner: Loosely mounted on the shaft 42 is a ratchet wheel 54 with whose teeth engage a pawl 55 reciprocated by means of a cam 56 on the shaft 50 so as to impart a relatively slow rotating movement to said ratchet wheel. Secured to or forming part of the ratchet wheel 54 is a cam 57 whose high portion acts upon the pawl 44 to move the same out of engagement with the teeth of the ratchet wheel 45 on the shaft 42, a suitable spring 44ᵃ serving to maintain said pawl 44 normally in engagement with said teeth. When the pawl is out of engagement with the ratchet wheel 45, no movement will be imparted to the shafts 41 and 42, and the reciprocating movements of the stave pusher 36 will be arrested, the movement being resumed when the lower portion of the cam 57 comes under the pawl 44 and permits the same to resume its engagement with the teeth of the ratchet wheel 45. By regulating the length of the high portion of the cam 57, therefore, the stave feeding devices can be kept out of operation for any desired length of time.

The stave feeding and shaping devices of the machine are shown in Figs. 3 and 4 and are as follows: Extending transversely across the machine in line longitudinally with the center of the stave which is delivered by the stave pusher is a bar 60 whose under surface is arched to accord with the desired longitudinal curve or bilge of the stave. This bar provides a bearing for the forward ends of a series of shafts 61 of which there may be as many as desired, three being shown in the present instance, so as to provide for a feeding action upon the stave between the successive pairs of wires with which the staves are interwoven. These shafts 61 are all rotated in the same direction from a shaft 62 by means of interposed spur gears, such, for instance, as shown by dotted lines at 165 in Fig. 3. Each of the shafts 61 has secured to it two disks 63 and 64, one before and one behind the bar 60, the peripheries of these disks and the under face of the bar 60 being shaped to accord with the desired transverse bend or curve of the stave. (See Fig. 4.) Beneath the bar 60 is another bar 65 which carries a series of short shafts 66 each of which is provided with a pair of disks $63^a$ and $64^a$ corresponding in position with the upper disks 63 and 64, the upper face of the bar 65 and the peripheries of the disks $63^a$ and $64^a$ being curved to conform to the desired transverse bend or curve of the stave, as also shown in Fig. 4. The bar 65 has, at each end, a depending arm 67 carrying at its lower end an anti-friction roller which runs upon the upper face of a cam bar 69 resting in a suitable guide upon the fixed frame and having reciprocating movement imparted to it at the proper intervals by connection with an arm 70 upon a rock shaft 71, to which intermittent rocking movement is imparted in the manner hereinafter described. By reason of this slight vertical movement of the bar 65 and its disks, the latter may be raised so as to firmly clamp between said disks and the upper disks 63 and 64 a stave which is being fed transversely into the machine, a slight drop in the bar 65 and its disks permitting the stave to be fed from between said feeding devices after said stave has fully entered the machine and has been properly shaped both longitudinally and transversely. A suitable stop 68 (Fig. 3) contacts with the forward end of the stave which is being fed laterally into the machine and thus insures the proper longitudinal alinement of the series of staves of which the barrel is composed and results in the formation of a symmetrical barrel. The stave which is being pushed laterally into the machine is gripped in the first place between a feed roll 72 on the shaft $63^a$ and a feed roll 73 on a lower shaft 74, the shafts $63^a$ and 74 being geared together and the shaft $63^a$ being geared to the shaft 62, as shown in Fig. 2, so that positive movement is imparted to both of the feed rolls 72 and 73 in order to insure the feeding of the stave into the machine.

Intermittent movements of rotation are imparted to the shaft 62 by bevel gears 75 and 76 (Fig. 4) from a transverse shaft 77, to which movement is imparted by means similar to those employed for imparting intermittent movements of partial rotation to the shaft 19, whereby the shafts which carry the wire spools are rotated, hence further description of this mechanism will be unnecessary, the various parts of the mechanism corresponding to the parts 13, 14, 15, 16, 17, 20 and 21 being numbered, respectively, $13^a$, $14^a$, $15^a$, $16^a$, $17^a$, $20^a$ and $21^a$, the part $13^a$ being carried by the spur wheel 6. The successive staves are pushed from between the feeding and shaping devices by means of dogs 79 carried by arms 90 which are mounted so as to be free to swing upon a rock shaft 91 mounted in suitable bearings on the opposite side frames of the machine, each of said arms 90 being connected by a link 92 to an arm 93 on the rock shaft 71, as shown in Fig. 4. Rocking movements are imparted to the shaft 71 by means of a cam 94 on the spur wheel 5, this cam acting upon an arm 96 which is connected by an adjustable link 97 to an arm 99 on the shaft 71, as shown in Fig. 1. Before being pushed forward into the machine the forward edge of each stave is brought into contact with a series of vertically guided and reciprocating fingers 100 whose lower ends are connected to a bar 101 to which vertically reciprocating motion is imparted by means of a cam 102 on the shaft 11, this cam acting upon an anti-friction roller at the lower end of a rod 103, whose upper end is connected to the bar 101, as shown in Fig. 4. By this means each stave is brought into its proper relation to the preceding stave before being pushed forward into the machine by the dogs 79, the fingers 100 dropping from in front of the staves as soon as such proper positioning of the latter has been effected.

As each of the staves is fed laterally into its proper position in the machine, it passes between the successive pairs of wires by which it is eventually to be retained in the barrel, the position of rest of the wire twister heads 31 and of the parts coöperating therewith being such as to maintain the wires of each pair normally in separated position after the manner of the warp threads constituting the open shed of a loom. As the stave is pushed forwardly by the dogs 79 its forward edge comes into contact with the rear edge of the preceding stave, the edges of the staves being preferably notched or recessed to receive the twisted portions of the wires so that the edges of the adjoining staves may meet and be pushed firmly into contact with one another. In order that this may be effectively done, it is advisable to firmly retain in position the preceding stave while a succeeding stave is being pushed up against the same, and for this purpose we employ a pair of clamping jaws 104 and 105 (Fig. 4) one on the outside of the stave and one on the inside of the same, one of these jaws being movable so as to properly clamp the stave when the succeeding stave is being pushed up against the same, and then to release it in order that it may be carried forward by the feeding devices hereinafter described, which act upon the barrel blank comprising a succession of staves which have been interwoven with the wires in the manner described. In the present instance the innermost jaw 105 is the movable one, said jaw being provided at each end with a depending arm 106 (Fig. 8) forked at its lower end so as to straddle the shaft 91 and provided with an anti-friction roller which is acted upon by a cam 107 on said shaft 91.

After each stave has been pressed forwardly into contact with the preceding stave and before the twisting of the wires in the rear of said last inserted stave, it is advisable to close said wires firmly onto the stave so as to insure a tight fit of the wires to the staves and thereby maintain the latter in contact with one another. For this purpose we employ a series of fingers 109 and 110, one above and one below each pair of wires, and at the proper times we impart reciprocating movement to these fingers so that they will approach each other just in the rear of the last inserted stave and thrust the wires firmly into contact with the outer and inner faces of said stave, the wires being held in this position until the same have been twisted together and thereby retained, whereupon the fingers 109 and 110 are separated from one another so as to permit the wires of each pair to separate prior to the introduction of another stave. The lower fingers 109 are secured to a bar 111 which is connected by a rod 112 to an arm 113 on a rock shaft 114, the latter having another arm 115 (Fig. 1) provided with an anti-friction roller which is acted upon by a cam 116 on the spur wheel 5. The upper wire closing fingers 110 are carried by a bar 117 vertically guided in the upper portion of the machine and said bar is reciprocated by connection with one arm of a lever 119, whose other arm is connected to a depending rod 120 provided, at its lower end, with an anti-friction roller which is acted upon by a cam 121 carried by a disk 122 on the shaft 11.

What we have termed the barrel blank consists of a number of staves sufficient to constitute the desired barrel, interwoven with pairs of wires twisted between the successive staves and in order to feed this blank forwardly during its formation we employ feeding devices at each end of the barrel blank, these devices comprising inner and outer jaws 123 and 124 for gripping the staves at each end, the jaws at each end of the stave being yieldingly mounted upon the outer portion of an arm 125 which can rock freely upon the central shaft 91 so that the jaws can be opened to release their hold upon the stave or closed so as to grip the same.

Secured to the shaft 91 adjacent to each of the arms 125 is another arm 126 which rocks with the shaft and has formed in it two cam slots 126$^a$ (Fig. 12) which receive bushings 127 surrounding bolts 129, one projecting from the jaw 123 and the other from the jaw 124. As the arm 126 swings forwardly with the rock shaft 91, the first effect of such movement is to cause the cam slots to drive the jaws 123 and 124 toward each other and cause them to grip the ends of the stave, further forward movement of the arm 126 being thereafter imparted to the stave so as to carry the same forward in the arc of a circle corresponding with that traversed by the jaws.

Rocking movement in one direction is imparted to the shaft 91 by means of a cam 130 on the spur wheel 7 (Fig. 1), this cam acting upon an anti-friction roller carried by one arm of a lever 131, hung to a stud on the side frame of the machine, movement in the opposite direction being imparted to said lever 131 by a weight 132 suspended by a rope or wire 133 from a quadrant 134 on the lever, contact of a lug 135 on the lever with a stud 136 on the side frame limiting the movement which can be imparted to the lever under the pull of the weight thereon. The lever 131 is connected by a link 137 to an arm 139 on the shaft 91, and said arm also carries a pawl 140 which engages with the teeth of a ratchet wheel 141, these teeth comprising a series of coarse or long teeth extending throughout the greater portion of the periphery of the ratchet wheel and a series of much shorter teeth extending throughout the remainder of said periphery.

On one side of the ratchet wheel 141 is a cam 142 which acts upon an anti-friction roller carried by a weighted lever 143 hung to one of the side frames of the machine, this lever, when under the influence of the cam 142, serving to engage a lug 144 carried by an arm 145 on the lever 131, and thereby limit the movement of said lever, under the influence of the weight 132, after the lever has been moved in the opposite direction by the action of the cam 130.

During the feeding of the staves to form the barrel blank the lever 143 is free from the influence of the cam 142, and consequently exercises no restrictive influence on the movement of the lever 131, the latter having its full swing, which causes movement of the pawl 140 from tooth to tooth of the coarse teeth of the ratchet wheel 141, and movement of the stave feeding jaws 123 and 124 to the extent of the full width of a stave. When, however, the proper number of staves to constitute the desired barrel have been interwoven with the pairs of wires and the further feeding of the staves is discontinued for a time, it is desirable to feed the barrel blank forwardly by a succession of short movements and between such short movements to twist the pairs of wires so that at the end of each barrel blank a certain length of twisted wires will be produced. By preference, this length of twisted wires is equal to the width of two staves and the twisted wires are severed midway of their length so as to produce at each end of the barrel blank twisted wires of a length equal to the width of a stave, although, as will be evident, the length of twisted wires produced may be longer or shorter than this, if desired. These twisted wires are retained in any suitable manner after the blank has been delivered from the machine and its terminal staves have been brought together so as to complete the barrel. The feeding jaws 123 and 124 are each of a length sufficient to more than span the gap between the final stave of a completed barrel blank and the first stave of the next blank, so that at all times the feeding jaws will engage one or more staves and will thus serve to impart the desired movements both to the outgoing and incoming barrel blanks. The stave holding jaws 104 and 105 are each recessed on the inner face near each end of the jaws, as shown in Fig. 8, so as to permit the jaws 123 and 124 to pass through the same when said jaws 123 and 124 approach the limit of their rearward movement.

The severing of the twisted wires is effected by means of cutting disks 146 and 147, the disks 146 being on the inside of the barrel blank and carried by a bar 149 mounted in suitable supports on the opposite side frames of the machine, and the disks 147 being carried by a bar 150 mounted so as to be free to slide on similar supports, the adjoining faces of the bars 149 and 150 being curved to conform to the bilge of the barrel, as shown in Fig. 14, the pairs of cutting disks being laterally separated to accord with the position of the respective pairs of wires and being set upon the bars to conform to the different distances from the axis of the shaft 91 occupied by said pairs of wires, because of the bilge of the barrel.

Reciprocating movement is imparted to the bar 150 by means of a cam 151 on a ratchet wheel 152 to which intermittent movements are imparted by means of a pawl 153 forked at its lower end so as to embrace the shaft 42 and having an antifriction roller which is acted upon by a cam 154 on said shaft, as shown in Fig. 1. The cam 151 acts upon an anti-friction roller on a bar 155 which is formed to embrace the shaft 156 of the ratchet wheel 152 and is connected at its forward end to the rear end of the bar 150 which carries the cutting disks 147.

The parts are so timed that as soon as the desired length of twisted wires is formed between the successive barrel blanks and the central portion of said wires is in line with the cutting disks 146 and 147, as shown in Fig. 15, the bar 150 will be thrust forward and its cutting disks 147 will coact with the stationary cutting disks 146 to sever said twisted wires and the completed barrel blank will thereupon drop from the machine, a suitable inclined runway or a power driven conveyer being, by preference, provided for receiving said blank and directing it to any suitable place of discharge. Before the completion of the barrel blank the front edge of the foremost stave will contact with the backs of the arms 90, as shown in Fig. 4, and the continued insertion of staves will tend to maintain said forward edge in such position. While the twisted wires hold the staves firmly together there is sufficient flexibility in the barrel blank to permit it to sag after such contact of the forward stave with the arms 90 and the blank finally assumes the condition shown in Fig. 15 with the length of twisted wires between successive blanks in position between the knives 146 and 147, and when these knives advance and sever the twisted wires the blank drops from the machine.

It may, in some cases, be desirable to operate the machine by hand for a limited time, as, for instance, when starting the formation of the first barrel, or after repairing broken wires, and for this reason we provide, on the opposite end of the shaft 9 from that which carries the spur wheel 8, a ratchet wheel 160 with which engages a pawl 161 hung to a lever 162, the latter being mounted so as to be free to swing on the shaft 9 whereby, on the manipulation of this lever, intermittent movements of partial rotation may be imparted to the shaft 9 and from the latter to the other parts of the machine.

Although we prefer, in carrying out our invention, to twist the wires of each pair between successive staves, the wires may, if desired, be simply crossed instead of twisted, in which case the shafts 25 carrying the wire spools will have but a half turn at each operation instead of a full turn or more than a full turn.

When the wires are twisted, it is preferable always to twist them in the same direction, consequently the shafts 25 of our machine always turn in the same direction. If, however, the wires are to be twisted alternately from right to left, the shafts 25 may have alternate right and left motions, in which case the pawl and ratchet connection between the shaft 19 and the spur wheel 20 may be omitted and the spur wheel may be connected directly to the shaft, the rack 16 rising to form one twist and descending to form the next.

When the staves are originally flat and are forced into the curved shape which they assume in the barrel, the constant tendency of each stave to resume the flat form will cause it to press firmly against the adjoining staves and thus insure tight joints. By the use of the tension rings 29 and 30 between the wire spools and the point at which the wire is twisted, said wires are held firmly by said rings in case they break at the twisting point, and the broken ends are thereby prevented from flying back over the spools and can be readily recovered and rejoined.

Various modifications may be made in the details of our machine without departing from its essential principles and mode of operation and our broader claims are therefore independent of such minor details.

We claim:

1. In a machine for making barrels composed of staves interwoven with pairs of wires, the combination of means for imparting longitudinal bend or bilge to the staves, means for feeding the staves in the direction of their length between said stave bending devices, means for interweaving the pairs of wires with the stave while it is thus held in bilged condition and rigidly intersecuring said wires closely in the rear of the stave, and means for then feeding forwardly the secured and interwoven stave, whereby the pairs of wires will retain it in the bilged condition.

2. In a machine for making barrels composed of staves interwoven with pairs of wires, the combination of means for imparting longitudinal bend or bilge to the staves, means for feeding successive staves in the direction of their length to said bending devices, means for gripping the staves between the bending devices, means for interlocking the staves with the pairs of wires, and rigidly intersecuring the wires of each pair closely in the rear of each stave while it is thus held in bilged condition, means for releasing the secured stave from the grip of the bending devices, and means for then moving the secured stave forwardly beyond the bending devices.

3. In a machine for making barrels composed of staves interwoven with pairs of wires, the combination of means for imparting longitudinal bend or bilge and transverse curve to the staves, means for feeding the staves in the direction of their length between said stave bending devices, means for interweaving the pairs of wires with the stave while it is thus held in bilged condition and rigidly intersecuring said wires closely in the rear of the stave, whereby the pairs of wires will retain the stave in the bilged condition, and means for then feeding forwardly the secured and interwoven stave.

4. In a machine for making barrels composed of staves interwoven with pairs of wires, the combination of means for imparting longitudinal bend or bilge and transverse curve to the staves, means for feeding successive staves in the direction of their length to said bending devices, means for gripping the staves between the bending devices, means for interlocking the staves with the pairs of wires, and rigidly intersecuring the wires of each pair closely in the rear of each stave while it is thus held in bilged condition, means for releasing the secured and interwoven stave from the grip of the bending devices, and means for then moving the secured and interwoven stave forwardly beyond the bending devices.

5. In a machine for making barrels composed of staves interwoven with pairs of wires, the combination of means for imparting longitudinal bend or bilge to the staves, means for feeding successive staves in the direction of their length to said bending devices, means for interweaving the pairs of wires with the stave and rigidly intersecuring the wires of each pair closely in the rear of the stave, and means for forcing each stave in a direction transversely of its length into contact with the preceding secured and interwoven stave preparatory to the interweaving and locking of the last introduced stave.

6. In a machine for making barrels composed of staves interwoven with pairs of wires, the combination of means for imparting longitudinal bend or bilge to the staves, means for feeding successive staves in the direction of their length to said bending devices, means for interweaving the pairs of wires with the stave and rigidly intersecuring the wires of each pair closely in the rear of the stave, means for forcing each stave in a direction transversely of its length into contact with the preceding secured and interwoven stave preparatory to the interweaving and securing of the last introduced stave, and clamping means for gripping and holding said previous stave while the last introduced stave is being forced into contact therewith.

7. In a machine for making barrels composed of staves interwoven with pairs of wires, the combination of means for imparting longitudinal bend or bilge to the staves, means for forming open sheds of the pairs of wires, means for feeding successive staves in the direction of their length between said bending devices and into the open sheds of the pairs of wires, means for then closing the wires upon the inner and outer faces of the staves, means for then rigidly intersecuring the wires closely at the rear of the stave while the same is retained in the bent or bilged condition, and means for then feeding the secured and interwoven stave in a direction transversely of its length from between the bending devices.

8. In a machine for making barrels composed of staves interwoven with pairs of wires, the combination of means for feeding successive staves forwardly through the machine, means for engaging the pairs of wires with the successive staves, means for rigidly gripping and maintaining a preceding stave while the last inserted stave is being pushed up against the same, and then releasing said preceding stave, and means for feeding forwardly the staves which have been engaged by the pairs of wires.

9. In a machine for making barrels composed of staves interwoven with pairs of wires, the combination of means for forming a barrel blank by interweaving successive staves with pairs of wires, and a barrel blank feeder comprising stave gripping jaws, swinging arms carrying the same, and means for closing the jaws upon the staves preparatory to forward movement of said jaws and for releasing the jaws from the staves preparatory to backward movement of said jaws.

10. In a machine for making barrels composed of staves interwoven with pairs of wires, the combination of means for interweaving successive staves with pairs of wires, means for feeding the staves forwardly to the extent of the width of the stave between successive interweaving operations, means for discontinuing the supply of staves at intervals, means controlling the stave feeding means previously named, whereby, during the discontinuance of the stave supply relatively short movements of the interwoven staves will be effected, and means for twisting the pairs of wires during the time that such short movements are being effected.

11. In a machine for making barrels composed of staves interwoven with pairs of wires, the combination of means for interweaving successive staves with pairs of wires, means for feeding the staves forwardly to the extent of the width of the stave between successive interweaving operations, means for discontinuing the supply of staves at intervals, means controlling the stave feeding means previously named, whereby, during the discontinuance of the stave supply relatively short movements of the interwoven staves will be effected, means for twisting the pairs of wires during the time that such short movements are being effected, and means for severing, at a point between its ends, the length of twisted wires thus produced.

12. In a machine for making barrels composed of staves interwoven with pairs of wires, the combination of means for interweaving successive staves with pairs of wires, means for feeding the successive staves forwardly until a barrel blank has been produced, means for then discontinuing the supply of staves while still continuing the forward feed of the blank, means for twisting the wires during the latter feeding operation, and a barrel blank feeder comprising stave gripping jaws of such length as to bridge the space between the last stave of one barrel blank and the first stave of a succeeding barrel blank, swinging arms carrying said jaws, and means for closing the jaws upon the staves preparatory to forward movement of said jaws and releasing the jaws from the staves preparatory to backward movement of the jaws.

13. In a machine for making barrels composed of staves interwoven with pairs of wires, the combination of means for interweaving successive staves with pairs of wires, stave gripping jaws, swinging arms carrying the same, and other swinging arms having cam engagement with said jaws so as to move the same toward and from each other at the ends of the swinging movements of the jaw carrying arms.

In testimony whereof, we have signed our names to this specification, in the presence of two subscribing witnesses.

EDWARD W. ROBINSON.
HENRY P. FEISTER.

Witnesses:
JAMES H. BYINGTON,
J. F. STEVENS.

Copies of this patent may be obtained for five cents each, by addressing the "Commissioner of Patents, Washington, D. C."